Oct. 31, 1950 S. B. WILLIAMS 2,528,100

ELECTRONIC CALCULATOR

Filed May 31, 1946 10 Sheets-Sheet 1

INVENTOR
S. B. WILLIAMS
BY John A. Hall
ATTORNEY

Oct. 31, 1950 S. B. WILLIAMS 2,528,100

ELECTRONIC CALCULATOR

Filed May 31, 1946 10 Sheets-Sheet 2

INVENTOR
S. B. WILLIAMS
BY John A. Hall
ATTORNEY

Oct. 31, 1950 S. B. WILLIAMS 2,528,100

ELECTRONIC CALCULATOR

Filed May 31, 1946 10 Sheets-Sheet 3

INVENTOR
S. B. WILLIAMS
BY John Arall
ATTORNEY

ELECTRONIC CALCULATOR

INVENTOR
S. B. WILLIAMS
BY John A. Hall
ATTORNEY

INVENTOR
S. B. WILLIAMS
BY John A. Hall
ATTORNEY

Oct. 31, 1950 S. B. WILLIAMS 2,528,100

ELECTRONIC CALCULATOR

Filed May 31, 1946 10 Sheets-Sheet 6

INVENTOR
S. B. WILLIAMS
BY John A. Hall
ATTORNEY

ELECTRONIC CALCULATOR

INVENTOR
S. B. WILLIAMS
BY John A. Hall
ATTORNEY

Oct. 31, 1950 S. B. WILLIAMS 2,528,100

ELECTRONIC CALCULATOR

Filed May 31, 1946 10 Sheets-Sheet 8

INVENTOR
S. B. WILLIAMS
BY John A. Hall
ATTORNEY

Oct. 31, 1950 S. B. WILLIAMS 2,528,100

ELECTRONIC CALCULATOR

Filed May 31, 1946 10 Sheets-Sheet 9

INVENTOR
S. B. WILLIAMS
BY John A. Hall
ATTORNEY

INVENTOR
S. B. WILLIAMS
BY John A. Hall
ATTORNEY

Patented Oct. 31, 1950

2,528,100

UNITED STATES PATENT OFFICE 2,528,100

ELECTRONIC CALCULATOR

Samuel B. Williams, Brooklyn, N. Y., assignor to Bell Telephone Laboratories, Incorporated, New York, N. Y., a corporation of New York Application May 31, 1946, Serial No. 673,504

10 Claims. (Cl. 235—61)

This invention relates to calculators and particularly to electronic devices by which mathematical calculations may be carried out by electrical and electronic effects without the use of moving mechanical parts such as gear trains, number wheels, cams and other conventional adding machine parts.

An object of the invention is to provide calculating means which will operate at extremely high speed. Another object is to provide an electronic calculator employing a minimum number of vacuum tubes. An objection to high speed electronic calculators heretofore produced is that the failure of a vacuum tube, where a great array thereof is used, may be expected to occur statistically at given and fairly frequent intervals and the detection of such a failure and the replacement thereof takes a certain length of time during which the operation of the device comes to a halt. Applicant overcomes this objection to a great degree by employing the rotary beam tube, one of which is capable of performing the duties of a large number of otherwise conventional tubes.

A feature of the present invention is the use of rotary beam tubes as entry means, counters and switching devices in a calculator.

Another feature is the use of a rotary beam tube in a circuit arrangement whereby the beam may be moved from position to position on a step-by-step basis. Supplementary to this is a feature whereby the movement of the beam in its rotation may be self-controlling analogous to a self-interrupting stepping switch.

Another feature is the use of a rotary beam tube in a circuit arrangement whereby the beam may be rotated at will in either a clockwise or a counter-clockwise direction. Broadly speaking calculation may be performed by either a positive or a negative rotation, that is if multiplication and addition are performed by clockwise direction of movement then it becomes simple to perform division and subtraction by a counter-clockwise movement.

Another feature is the use of a common field for a plurality of rotary beam tubes whereby a plurality of beams may be simply and simultaneously controlled.

A feature of the invention is the use of rotary beam tubes to control closed ring and open chain circuits of other tubes such as gas-filled tubes. A closed ring of ten tubes forms an excellent decimal denominational order counter and an open chain may be used to control a non-repeating sequence of operations.

Other features will appear hereinafter.

The drawings consist of ten sheets having sixteen figures, as follows.

Figure 12:
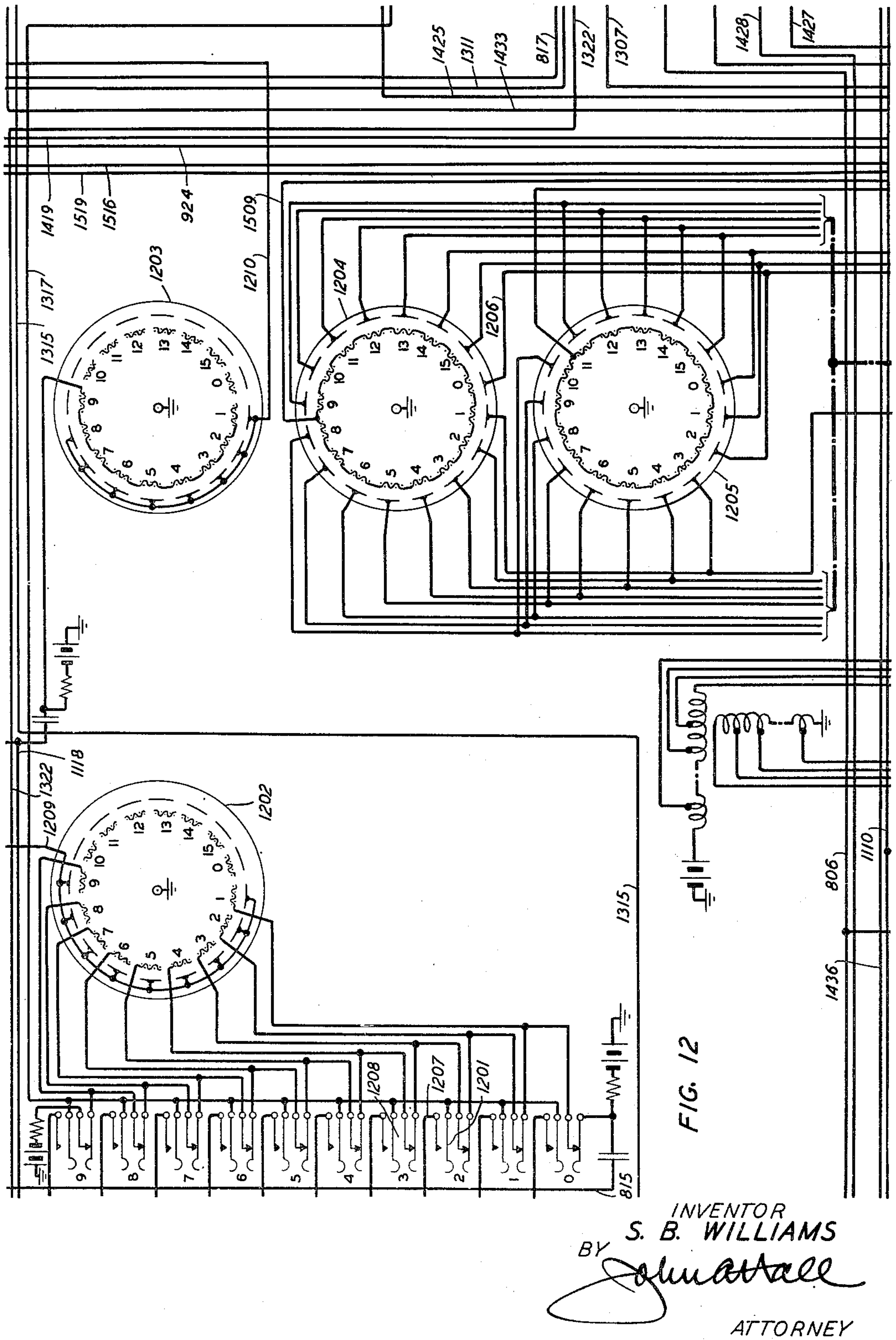
Fig. 12 shows a tube and a set of digital keys for registering the tens digit of a multiplier, a circuit switching tube and two tubes for controlling the common field coils of the tubes of Figs. 9 and 12, one to produce a clockwise rotation of the beams for addition and multiplication and the other to produce a counter-clockwise rotation of the beams for subtraction and division.
Figure 13:
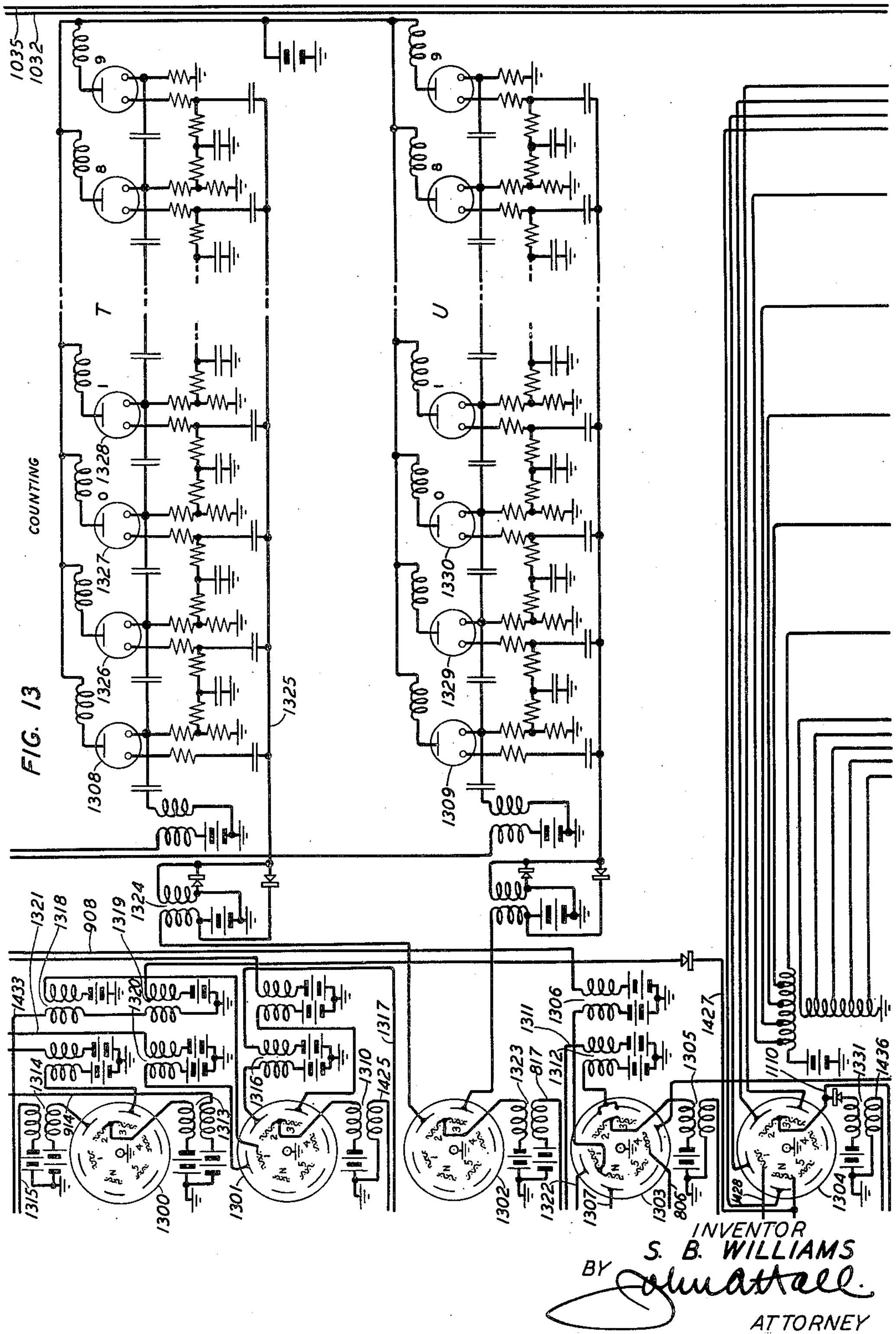
Fig. 13 shows five rotary beam tubes operated in common with the rotary beam tubes of Fig. 10 for distributing and shifting and two open chain arrangements of gas tubes for counting the number of subtractions of a divisor from a dividend to produce the tens and units digits of a quotient.
Figure 14:
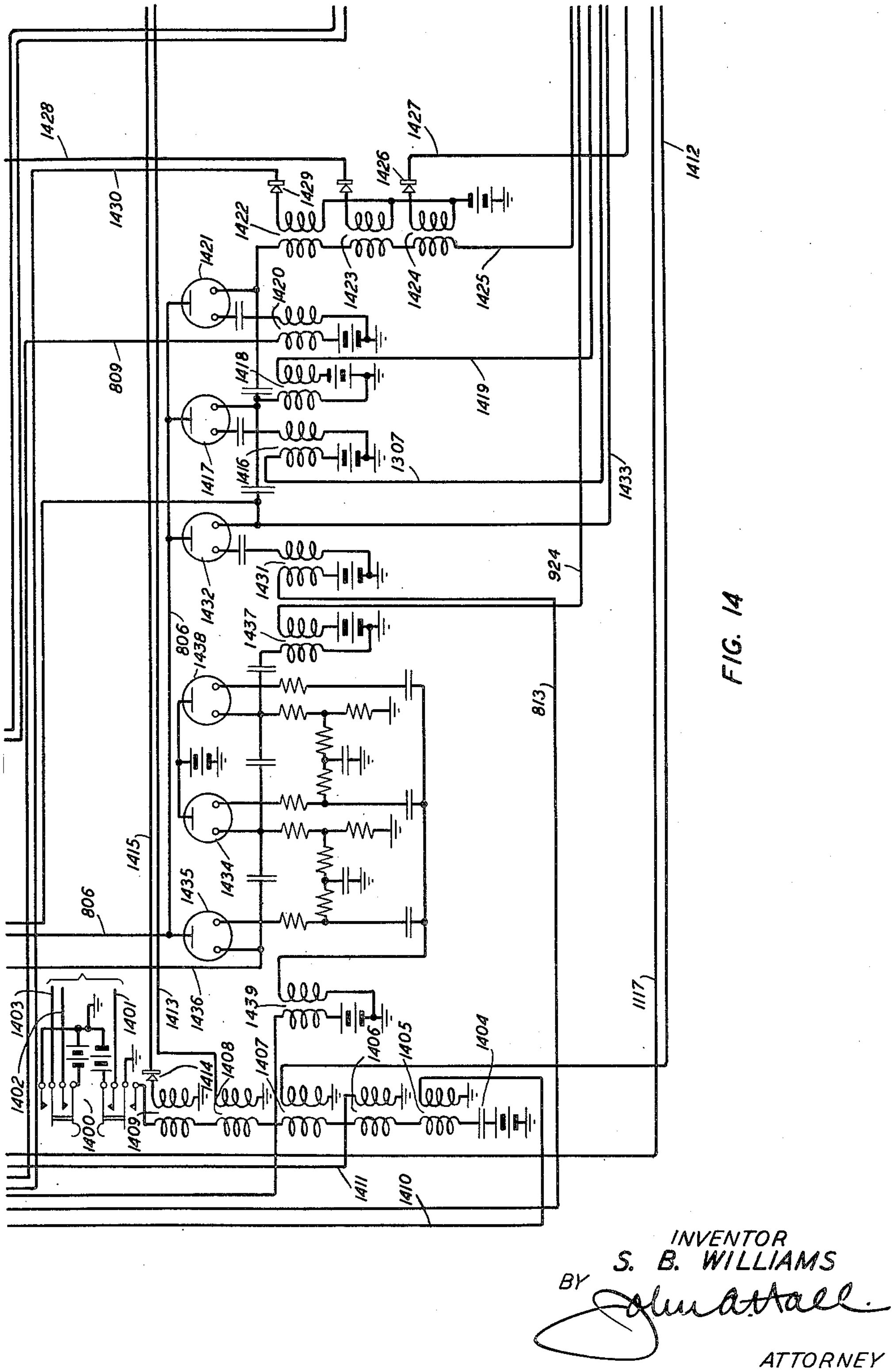
Fig. 14 shows a start key for starting a computation after the factors thereof and the nature of the operation have been registered and a plurality of gas tubes for switching and for pulse supply.
Figure 15:
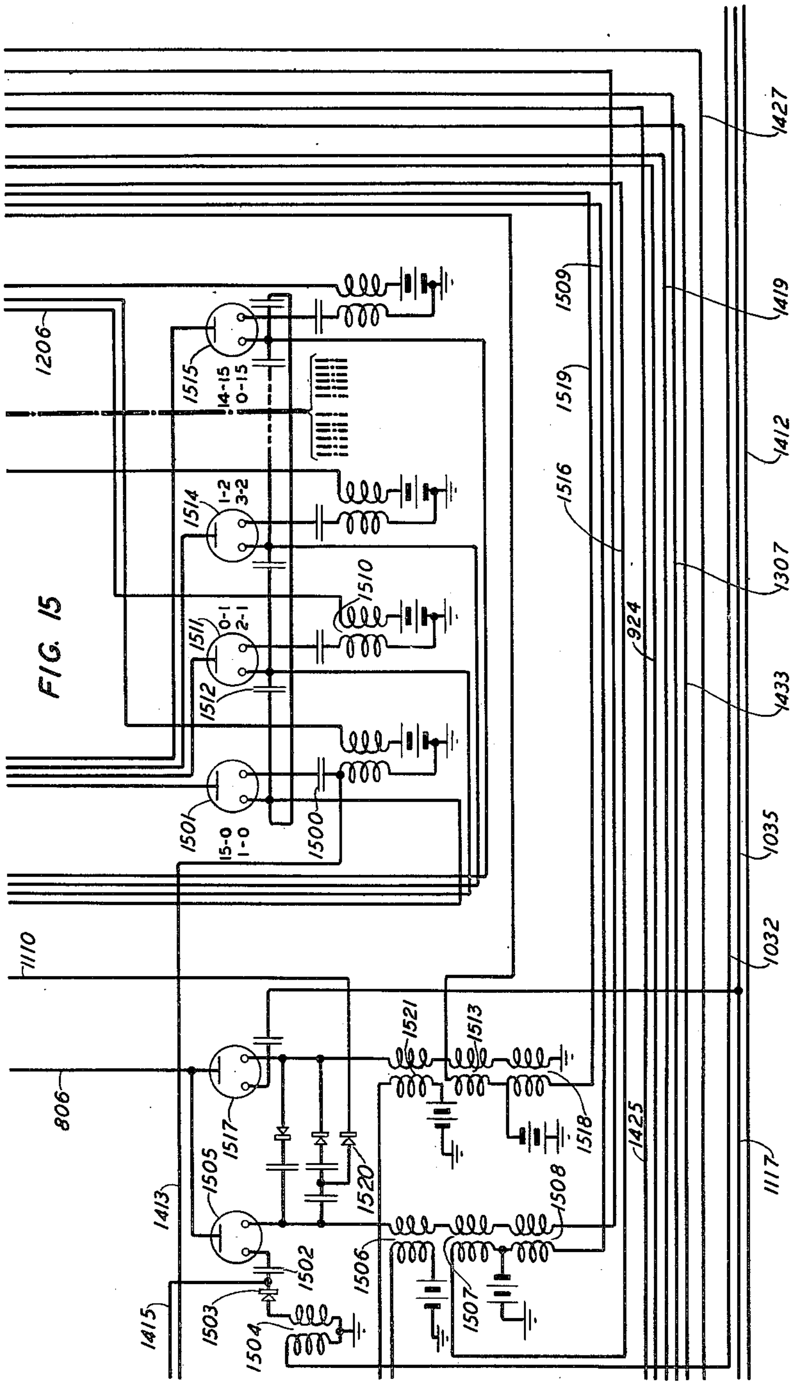
Fig. 15 shows a plurality of gas tubes, one for directing the clockwise and another for directing the counter-clockwise rotation of the beams of the tubes of Figs. 9 and 12 and others for controlling the field coils of these rotary beam tubes.
Figure 16:
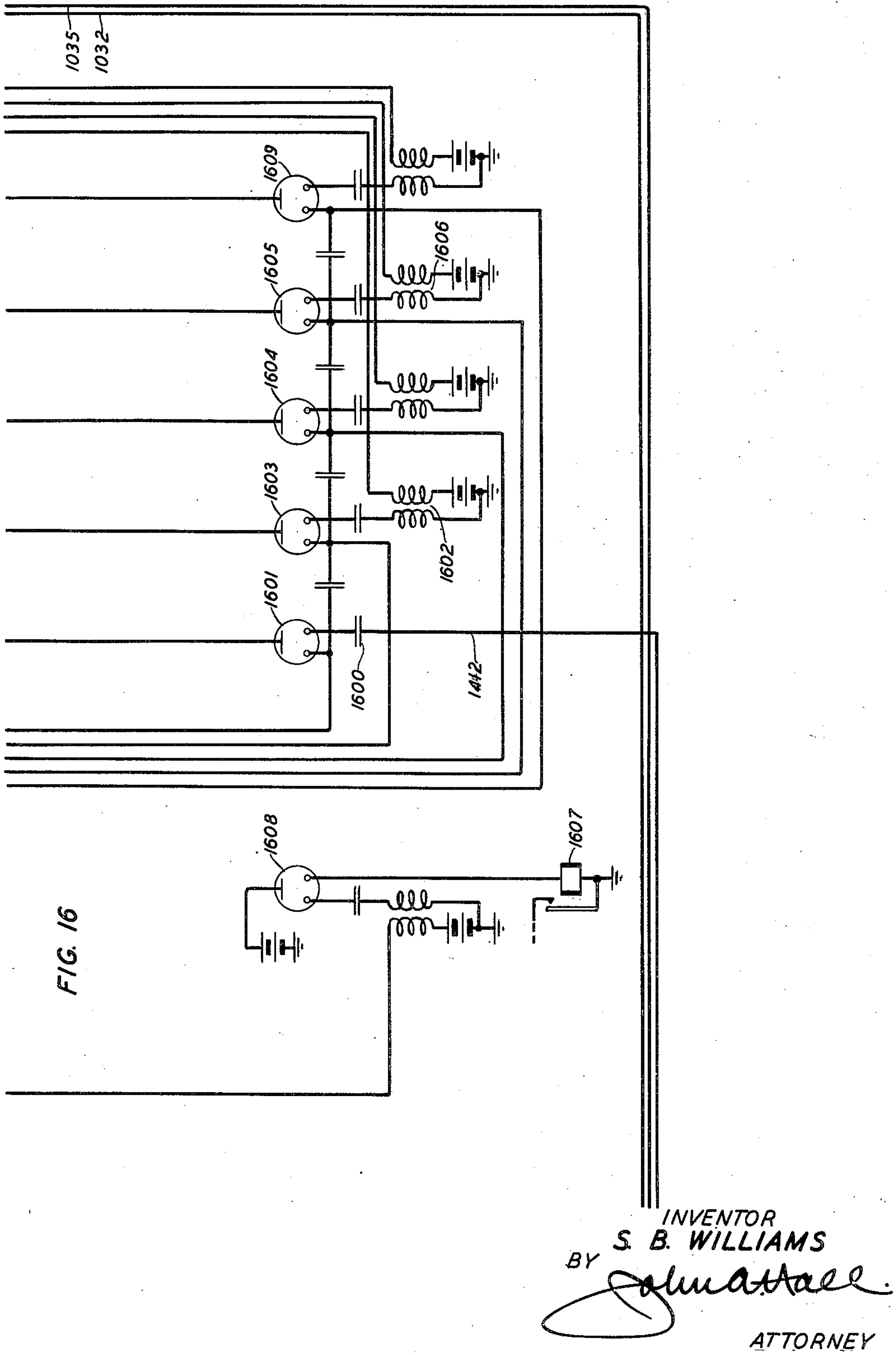
Fig. 16 shows a plurality of gas tubes used in the control of the field coils of the distributing and shift tubes of Figs. 10 and 13.

In the description of the computing device as shown in Figs. 8 to 16 designation numerals are used whose tens and units digits are of a general nature but whose hundreds digit or hundreds and thousands digits correspond to the figure number. Where a circuit is traced from figure to figure the numeral used therefor will identify the figure in which the circuit started. In Fig. 14 the start key is shown as a means to connect positive battery to conductor 1401, negative battery to conductor 1402 and ground to conductor 1403. While ground and battery connections are shown throughout these wire figures, it will be understood that with few exceptions which will be especially noted, these connections are actually bus conductors leading to the conductors 1401, 1402 and 1403 so that no active connections exist until the start key has been operated and then the device as a whole is activated.

The present invention is an electronic computing system employing radial beam tubes of the type disclosed in Patent 2,217,774, granted to A. M. Skellett on October 15, 1940. Such a tube comprises a central cathode surrounded by a concentric ring of screens and anodes, the beam between the cathode and any one anode being controlled in direction by an external magnetic field directed in accordance with the principles controlling the rotating field of an alternating current motor. The anodes are connected to a positive source of potential, the screens to a negative source and the cathode to a point between here shown as ground. When a beam is directed in line with a paired screen and anode current will flow from the anode to the cathode so long as the screen is kept at its proper potential. Usually as set forth in the above-noted Skellett patent this is a negative potential so that the current flow to the anode is a minimum value only sufficient to maintain the beam. Changing this to a more positive value will increase the current flow to the anode and this may be used therefore as a means for establishing a path for the transmission of a pulse. If a screen is connected to a source of alternating current and the beam is directed to pass such screen a series of pulses of the same periodicity as the alternating current will be created in the paired anode circuit.

Figure 1:
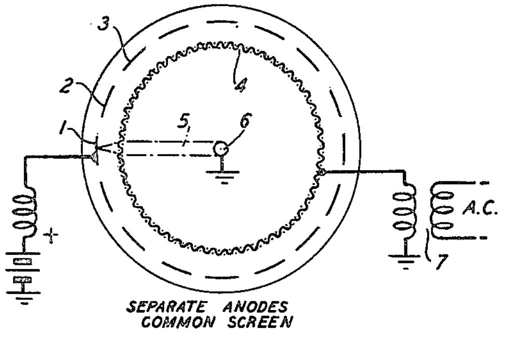
Fig. 1 is a schematic circuit diagram of a rotary beam tube arranged to deliver a train of pulses over any one of a plurality of circuits each connected to a separate anode from a source of alternating current connected to a common screen.

In the system herein described several of the different possible arrangements of these tubes are employed. For instance, as shown in Fig. 1 there are a plurality of separate anodes 1, 2 and 3 and a single continuous screen 4. As the beam 5 rotates (in either direction) the various anodes will be successively affected. If the screen 4 is connected to a source of alternating current by a transformer 7 a current will flow in an anode when the screen is at a proper potential, that is on the positive peaks of the alternating current.

Figure 2:
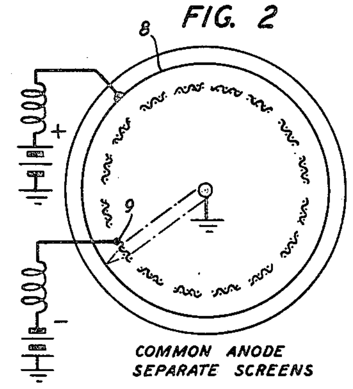
Fig. 2 shows a rotary beam tube in a circuit arrangement wherein the anodes are connected into a single circuit which may be selectively controlled from a plurality of incoming circuits each connected to a separate screen.
Figure 3:
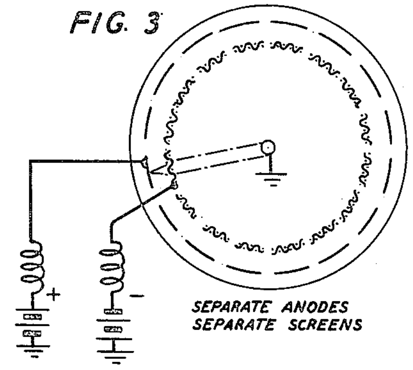
Fig. 3 is an arrangement using separate anodes and separate screens.
Figure 4:
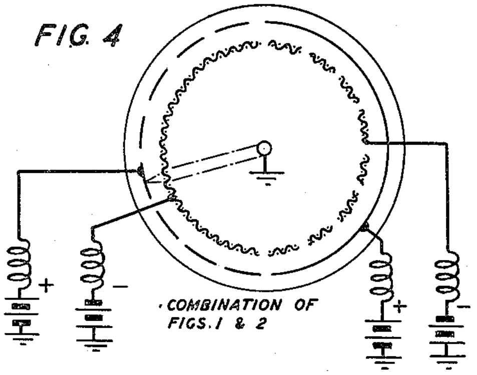
Fig. 4 shows how a combination of the arrangements of Figs. 1 and 2 may be used in one tube.

In Fig. 2 an arrangement is shown in which all the anodes are connected together to form a complete ring 8, but each screen is separately connected. By this arrangement a current will flow in the anode circuit each time the beam passes a screen such as 9 which is at the time connected to a negative source of potential. Fig. 3 shows another arrangement in which separate anodes and separate screens are employed and Fig. 4 shows a combination of the Fig. 1 and Fig. 2 arrangement. It will be obvious that many other variations of these fundamental arrangements may be used.

Figures 5, 6:
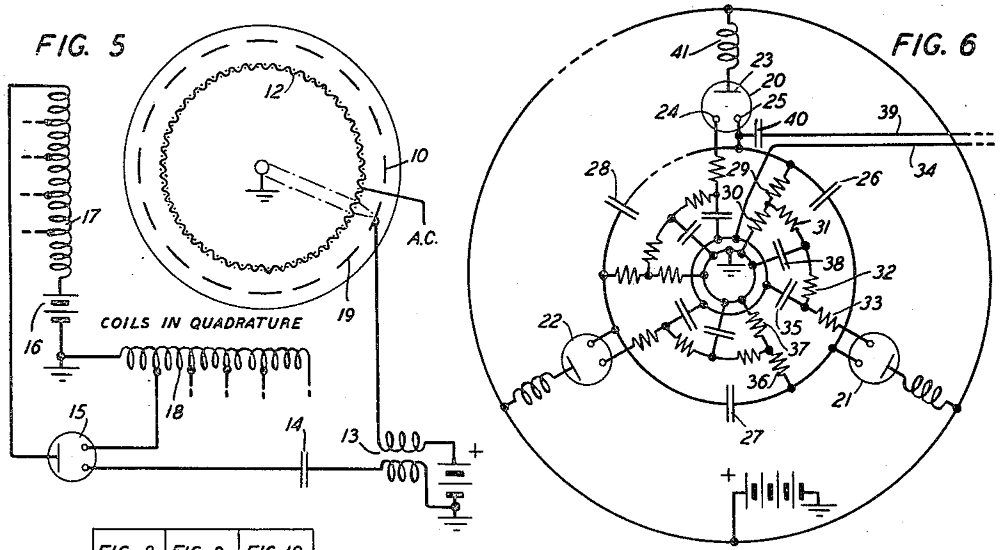
Fig. 5 shows how the field of such a tube may be controlled to move the beam forward on a step-by-step basis.
Fig. 6 is a schematic circuit arrangement showing how a plurality of gas tubes may be connected in what is known as a closed ring in which one tube is in operative or conducting condition and the next in order is in a primed condition whereby a pulse coming into a common circuit will fire the primed tube, extinguish the operating tube and prime the next in order tube.
Figure 7:
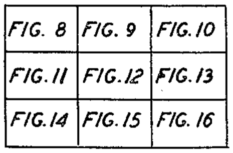
Fig. 7 is a block diagram showing how Figs. 8 to 16, inclusive, may be arranged to form a circuit diagram showing circuits sufficiently extensive to give a clear understanding of the principles of operation of an electronic computer based on the use of rotary beam tubes.
Figure 8:
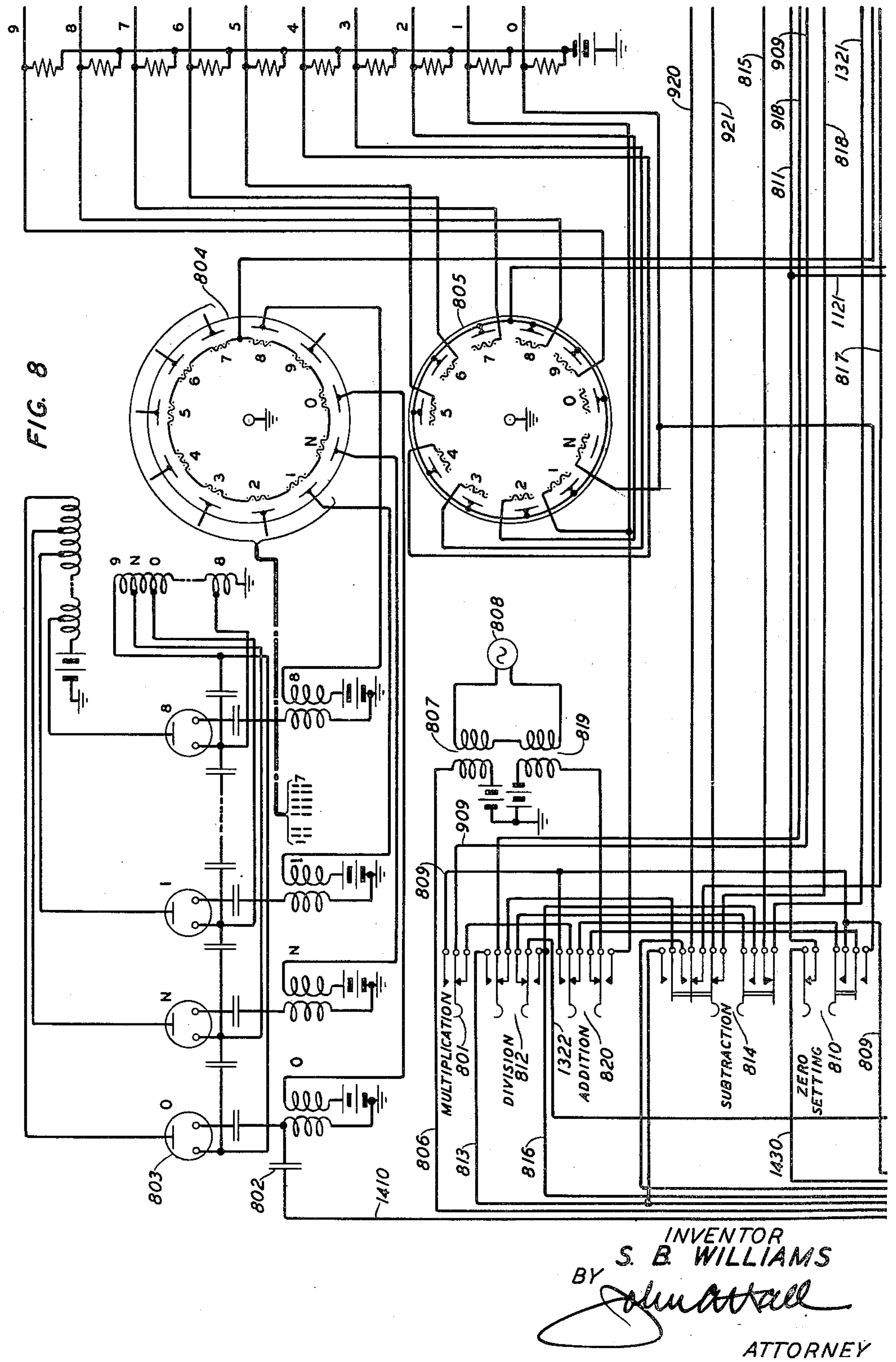
Fig. 8 shows a pair of rotary beam tubes employed to control the number of additions of a multiplicand which are made in accordance with the units digit of a multiplier, the common field coils for such tubes and the operation controlling keys for the device.

The rotating field may be produced by two coils arranged to produce magnetic fields at right angles to each other and excited by two-phase alternating current. This will provide a continuously rotating field. Or two coils in quadrature may be used, which coils may be differently energized to produce a field pointing in any given direction, as shown for instance in Patent No. 2,243,399, granted to A. M. Skellett on May 27, 1941, or Patent No. 2,327,792, granted to F. A. Hubbard, August 24, 1943. With a field of this nature the beam may be advanced step-by-step as indicated in Fig. 5. Here we will say that the beam has been advanced in a clockwise direction from anode 10 to anode 11. It will remain in this position until the screen 12 is brought to the proper potential, as at a given point in a cycle of alternating current. Thereupon current will flow in the anode circuit of anode 11 through a primary of a transformer 13. The build-up of current in this transformer produces a pulse in the secondary great enough to pass through the condenser 14 to the striking cathode of the gas-filled tube 15. Tube 15 ignites and a current flows from positive battery 16, through a selected percentage of the coil 17, anode of tube 15, operating cathode thereof a selected percentage of coil 18 to ground. The selected percentages of coils 17 and 18 are such as to produce a field to point the beam of the tube to the next anode 19. Through means which will presently be described the firing of tube 15 will extinguish another tube which was previously operated to excite the coils 17 and 18 in selected percentages to point the beam of the tube to the anode 11. Similarly when the screen potential is again brought to a proper point another tube such as 15 will be fired, the tube 15 will be extinguished, the coils 17 and 18 will be excited in another pattern and the beam will be rotated to the succeeding anode. The screen 12, instead of being connected to a source of alternating current may be connected to a circuit which may be affected at will or under control of other circuits so that the beam may be held on a given anode until a circuit operation controlled over such anode has been completed and the completion or satisfaction signal used for controlling the advance to the next anode.

Another arrangement must be noted. A plurality of radial beam tubes may be excited from the same field or if physical limitations become obstacles to this arrangement then several fields may be connected together so that the effect is the same. In the present disclosure a single field is shown as controlling a plurality of tubes as follows:

| Tube | Field—Controlled by tubes | | | |
|---|---|---|---|---|
| | 1501 etc. | 1601 etc. | 803 etc. | 1101 etc. |
| 904 | √ | | | |
| 905 | √ | | | |
| 906 | √ | | | |
| 907 | √ | | | |
| 1202 | √ | | | |
| 1203 | √ | | | |
| 1204 | √ | | | |
| 1205 | √ | | | |
| 1000 | | √ | | |
| 1001 | | √ | | |
| 1002 | | √ | | |
| 1003 | | √ | | |
| 1300 | | √ | | |
| 1301 | | √ | | |
| 1302 | | √ | | |
| 1303 | | √ | | |
| 1304 | | √ | | |
| 804 | | | √ | |
| 805 | | | √ | |
| 1102 | | | | √ |
| 1103 | | | | √ |

Gas tubes may be used to count pulses. Fig. 6 shows the fundamental counting arrangement here put in the form of a closed ring for purposes of explanation. Here three tubes 20, 21 and 22 are shown each having an anode such as 23, a striking cathode such as 24, and an operating cathode such as 25. The operating cathodes are interconnected with condensers 26, 27 and 28 and each has a work circuit consisting of resistance such as 29 and 30. If the tube 20 is operating then the potential between resistances 29 and 30 is communicated over resistances 31, 32 and 33 to the striking cathode of the next in order tube 21 so that this tube is primed. Now if a pulse is transmitted over the counting conductor 34, the primed tube 21 will fire through the condenser 35. Tube 20 which is operating at this instant cannot respond to the pulse on the wire 34 and tube 22 not being primed cannot respond to such a pulse. As tube 21 fires and current flows through its load resistances 36 and 37 the tube 20 is extinguished by commutation over condenser 26. Due to the combination of the resistance 31 and condenser 38 the priming condition for tube 21 is delayed on the firing of tube 20 so that tube 21 may not be sufficiently primed to respond to the same impulse which has fired the tube 20. In this manner the tubes will respond indefinitely in succession to a train of impulses on the pulse wire 34.

When such a closed ring is used for counting in a decimal system there are ten such tubes placed in a closed ring. In order to start the counting always at the same place, a zero setting circuit 39 is connected through a condenser 40 to the operating cathode of the zero tube. A starting pulse on circuit 39 will set the ring at zero and thereafter counting will take place as described.

Tubes which glow when operating may be used and these will form their own indicators so that if numbered or appropriately mounted they will serve to show how many pulses have been transmitted. Alternatively, a coil such as 41 may be inserted in each anode circuit and this coil will then respond to current flow therethrough as a relay winding to produce any appropriate indication.

In a decimal system with ten tubes in each closed ring carry means are provided so that when a tenth pulse is counted a carry of one to the next higher decimal order is transmitted. This will be described more in detail hereinafter.

The invention is illustrated in Figs. 8 to 16 in the form of a device capable of handling only two digit numbers. While such a device would have little practical utility, its expansion to a device capable of handling seven, ten or more place figures would only require duplication of the various units so that this simple disclosure will be sufficient to explain the methods of operation and the type of means necessary for a large scale computer.

*General operation*

Figure 9:
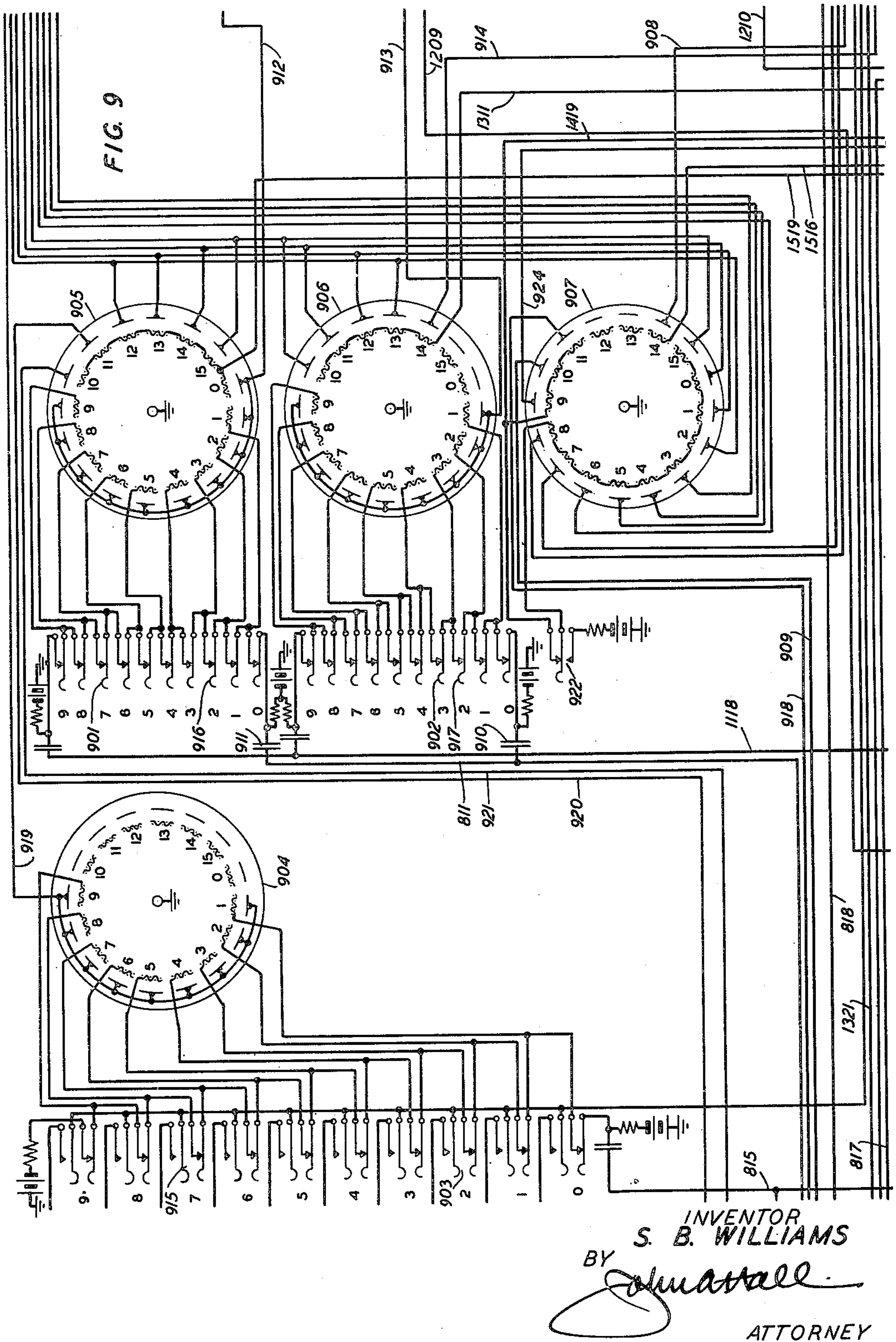
Fig. 9 shows a multiplier units digit tube and the ten digital keys for registering such digit, the units and tens digit multiplicand tubes and the digital keys therefor and a circuit switching tube, these four tubes along with four similar tubes shown in Fig. 12 being controlled by a common set of field coils.

In Figs. 9 and 12 the rotary beam tubes 904, 905, 906, 907, 1202, 1203, 1204 and 1205 constitute the principal control of the system. Upon the operation of the start key 1400 (after the proper operation of other keys) the beams of these tubes will be set into motion. If the problem is one of multiplication or addition, then the tube 1505 will operate and supply a long train of pulses which through the agency of tube 1204 will cause a clockwise rotation of the beams of the tubes of Figs. 9 and 12. If, on the other hand, the problem is one of division or subtraction then the tube 1517 will operate and supply a long train of pulses which through the agency of tube 1205 will cause a counterclockwise rotation of the beams of these tubes.

Tube 905 is for transmitting the units digit and tube 906 is for transmitting the tens digit of the multiplicand, the addend, the subtrahend or of the divisor. Tube 904 is for transmitting the units digit and tube 1202 is for transmitting the tens digit of the multiplier or the dividend.

Tube 907 is a switching control tube mainly used for setting the accumulator tubes to zero and generally preparing the device for proper operation. The tube 1203 is a switching tube used for filling in nines in the TH and T places while transmitting the complement of the divisor.

The tubes 1000, 1001, 1002, 1003, 1300, 1301, 1302, 1303 and 1304 are known as the shift tubes and are all under control of a common field controlled generally through the tube 1304.

While the movement of the beams of the tubes of Figs. 9 and 12 is on a step-by-step basis it is nevertheless continuous. The movement of the beams of the shift tubes, however, is discontinuous and only occurs when some major operation has been completed, as, for instance, the entry of the multiplicand into the accumulator the number of times directed by the tens digit of the multiplier.

The tubes 804, 805, 1102 and 1103 are counting tubes whose beams are moved forwardly step by step as the entry of the multiplicand is counted.

The operation of the start key transmits pulses to establish the beams of the above described tubes and to set those of the shift tubes and the counting tubes on their N positions and those of the control tubes of Figs. 9 and 12 to their 0 positions whereupon the rotation of these beams commences.

In any type problem no action takes place until the beam of tube 907 reaches its position 14, whereupon tube 1417 is fired to provide a source of pulses to be applied to the screens 0 to 11 and 15 of tube 907. Therefore, the beams of the control tubes of Figs. 9 and 12 make two complete rotations to prepare for the actual calculating process. During such calculation the beams of such tubes then rotate a number of times equal to the sum of the multiplier digits. In an example to be given in detail hereinafter where the multiplicand 37 is multiplied by the multiplier 22, the beams of these tubes rotate six times, that is, once to reach and fire the tube 1417, a second time to clear the accumulators, a third and a fourth time to enter the multiplicand in the accumulators in accordance with the multiplier tens digit 2 and a fifth and a sixth time to enter the multiplicand (shifted one place to the right) in acordance with the multiplier units digit 2.

Figure 10:
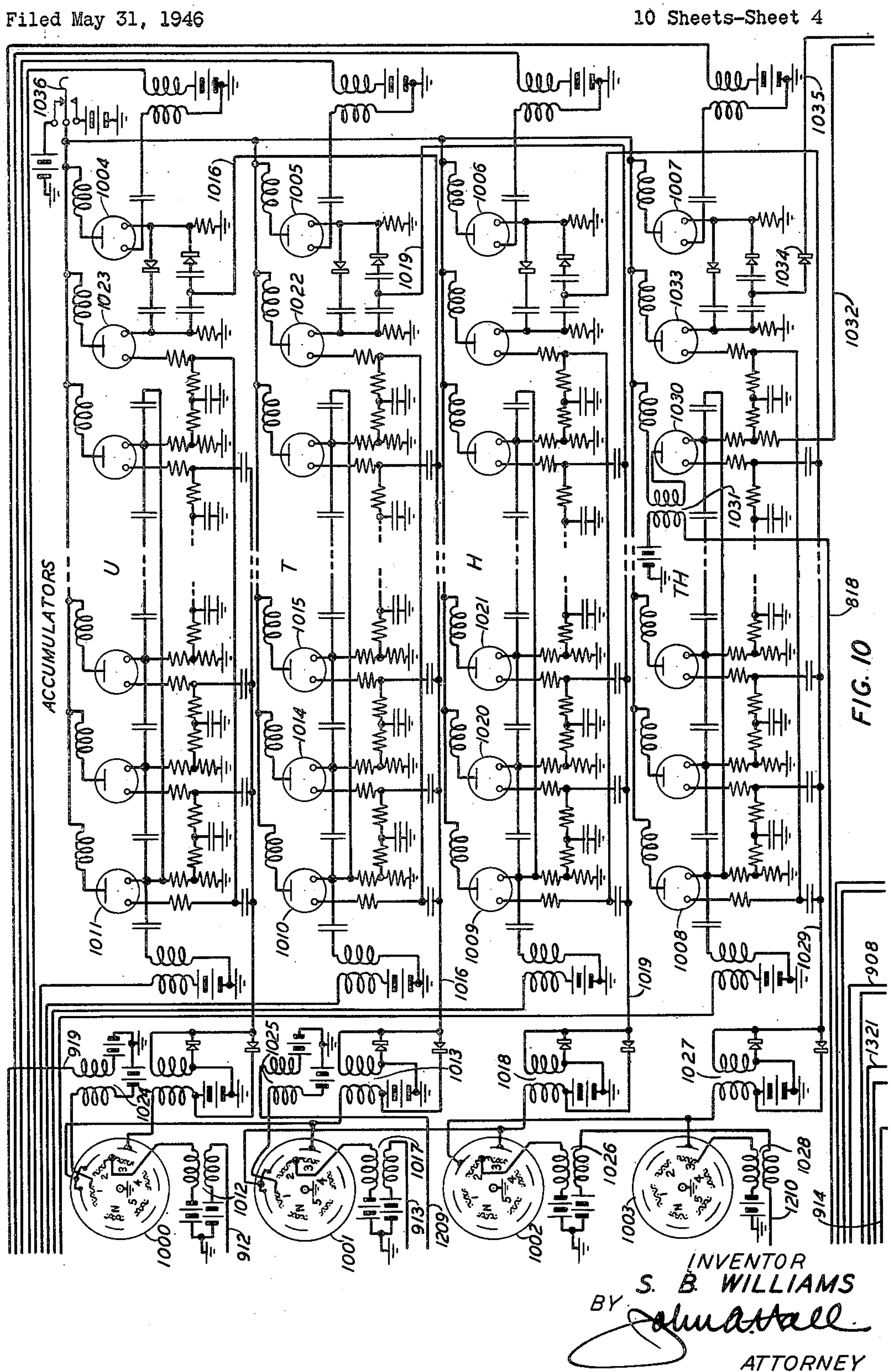
Fig. 10 shows four pulse distributing and column shifting tubes and four closed rings of gas tubes used as accumulators, the four rotary beam tubes in this figure along with five similar tubes in Fig. 13 being controlled by a common set of field coils.
Figure 11:
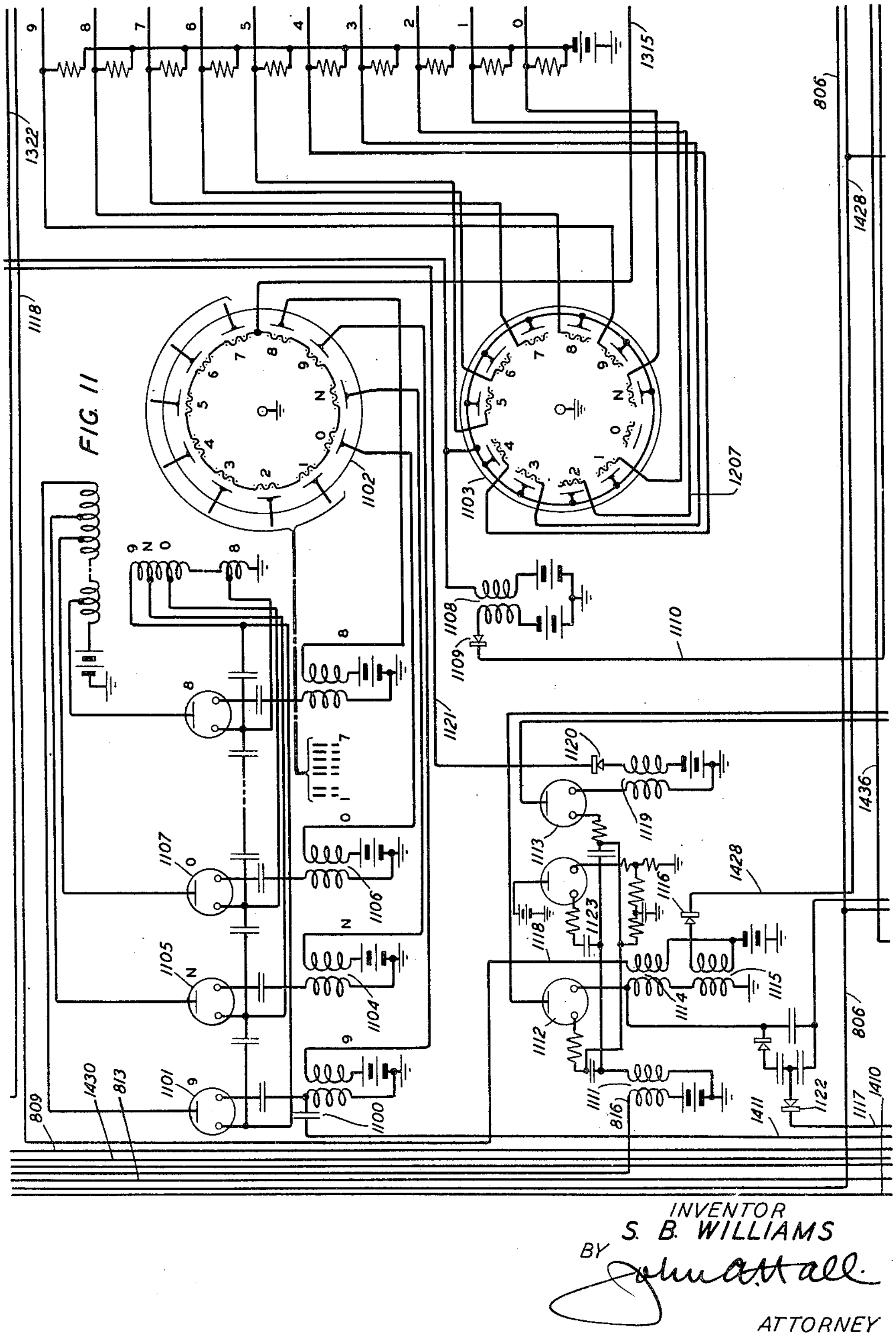
Fig. 11 shows a pair of rotary beam tubes in an arrangement similar to those of Fig. 8 for counting the number of additions of a multiplicand made in accordance with the tens digit of a multiplier, both under control of a common set of field coils.

The shift tubes of Figs. 10 and 13 operate generally as follows: After the tube 1417 has been fired and the screens of tube 907 have been supplied with a source of pulses, then when (on the second rotation of the beam in multiplication) position 10 of tube 907 is reached the shift tubes are moved from their position N to position 1 and on the next pulse (by tube 1421 and transformer 1423) immediately thereafter to their position 2. In this position the tens multiplier digit is effective as a counting control. The multiplicand is transmitted without shift and when it has been entered two times the passage of the beam of tube 906 over its position 14 now completes an electronic circuit through key 1201 and tube 1103 to cause the shift tubes to move from their second to their third positions. During the next two rotations of the beams of the control tubes the multiplicand is shifted one place to the right and transmitted twice to the accumulator. Then in the sixth rotation of these beams an electronic circuit is completed in the position 14 of tube 906 through key 903 and tube 805 to move the beams of the shift tubes from their positions 3 to their number 4 or display positions.

In a problem of addition each quantity entered is entered as a addend, that is, one quantity is entered by writing it up as a multiplicand which will be automatically multiplied by one and then the next member will be entered in the same manner. In this case the beams of the control tubes will make three complete revolutions, the first to reach and fire the tube 1417, the second to reach and fire the tube 1421 and the third to enter the addend into the accumulator. The multiplier keys are not used but a connection from the position 1 screen of counting tube 805 establishes the connection for two pulses from alternating current source 808 to transformer 1108 to successively drive the beams of the shift tubes through their second and third positions to their fourth or display positions.

In a problem of division the control tubes operate as in a problem of multiplication, that is, a first revolution of the beams of the control tubes is made to reach and fire the tube 1417 to place a source of pulses on the screen of tube 907 so that the accumulator may be reset to zero during the second revolution of the beam of such tube. During the third revolution of the beams of the tubes of Figs. 9 and 12 the dividend will be entered, through the number 1 position of the shift tubes. When in this third revolution of the control tubes position 14 is reached the shift tubes are advanced from their first to their second positions and tube 1517 is fired to reverse the direction of rotation of the beams of the control tubes. Thereafter during the counterclockwise rotation of these beams the complement of the divisor is repeatedly entered into the accumulator until an overdraft is achieved whereupon the beams are again reversed to clockwise rotation for one revolution to restore this overdraft.

The shift tubes are advanced to their third positions, the beams of the control tubes are reversed to counterclockwise direction and the complement of the divisor now shifted one place to the right is again repeatedly entered into the accumulator until another overdraft is achieved. This is restored and the shift tubes are advanced to their fourth or display positions.

The quotient digits are counted off by the tube 905 in its position 11. It will be noted that the quotient digit counters have an extra two tubes. The tube 1308 is the zero setting tube. The next in order, tube 1326, is for absorbing an extra counting pulse, and the tube 1327 is the actual zero tube. Thus when an actual count of one is made as will be more fully described hereinafter the tube 1328 will be finally fired.

Upon the first counterclockwise rotation of the beam of tube 905 and prior to the entry of the first complement of the divisor, tube 1326 is fired in position 11 of tube 905. After the entry of this complement and prior to the second entry of the same quantity (which produces an overdraft—assuming the actual count to be 1), the tube 1327 is fired. After this entry of the quantity which produces the overdraft, tube 905 again passes through position 11 and then fires tube 1328 to count 1. The overdraft is recognized in position 10 and the direction of the beam is reversed to restore the overdraft.

In a problem of subtraction the minuend is written up on the keys to the left of tubes 905 and 906 as an addend and is accumulated as such by the use of the addition key 829. Keys 922 and 1036 are operated to hold the accumulator and then the subtrahend is written up on the same keys only this time the subtraction key 814 is operated. Now the operation will be as previously described. There will be no need to report the count of reverse rotations of the beam of tube 905 and since but a single subtraction is made there is no necessity for making an overdraft and a restoration. However, the beam of tube 905 will pass through its eleventh position twice, once as it starts its counterclockwise rotation and again after the subtraction is made. On its first passage the tube 1434 is fired to absorb the impulse produced thereby this tube performing the same function as tubes 1326 and 1329 in the quotient digit chains. On its second passage tube 1435 is fired to terminate the calculation and drive the shift tubes to their fourth or display positions.

*Multiplication*

The invention will be illustrated first by showing how 37 may be multiplied by 22. Since there are four places in the accumulator the number 37 will be treated as 0370 so that the calculation takes the form of an accumulation of values in the following manner.

| | |
|---|---|
| 0000 | Augend—original |
| 0370 | Addend |
| 0370 | Sum—becoming Augend for next summing operation |
| 0370 | Addend |
| 0740 | Sum—becoming next Augend |
| 0037 | Addend |
| 0777 | Sum—becoming next Augend |
| 0037 | Addend |
| 0814 | Final sum—product of 37×22 |

The first (left-hand) decimal denominational order is provided for carries so that if for instance 45 were multiplied by 33 the product 1485 could be properly expressed. With these four places in the accumulator absolute accuracy in the multiplication of any two-digit number by any other two-digit number may be attained. Four places will also suffice for all problems in subtraction and addition. When, however, the device is used for expressing the sum of a large number of two-digit numbers it will be readily understood that more decimal orders to the left must be provided. In the case of division means have here been provided to compute only two digits of the quotient even though it be understood that the division of a two-digit number such as 22 by even a one-digit number such as 7 will actually produce a never-ending succession of quotient digits.

The digits of the multiplicand and multiplier are written up on the keys shown in Figs. 9 and 12, the units digit 7 of the multiplicand by the operation of key 901, the tens digit 3 thereof by the operation of key 902, the units digit 2 of the multiplier by the operation of key 903 and the tens digit thereof by the operation of key 1201.

It will be understood that any type means may be used for entering values in the computer, such as relay registers, switch registers, punched cards or tapes or simple keys. The keys may be mechanically controlled or they may be magnetically controlled. It will be assumed here that each digital group of keys is of the mechanically interlocking type, that is, when the key 901, by way of example, is depressed, it will release any other operated one of its group and then remain mechanically locked in its operated position until similarly released by the depression of another.

The operation of the multiplicand digit and the multiplier digit keys is followed by the operation of the multiplication key 801 and lastly by the operation of the start key 1400. Through its lowermost contact key 1400 closes a circuit from positive battery, through condenser 1404, the primary windings of transformers 1405, 1406, 1407, 1408 and 1409, the lower contacts of key 1400 to ground. These transformers may be separate coils or they may be combined in a single structure having a common primary and a plurality of separate secondaries. In any event the charging current of the condenser 1404 will be transformed into a pulse transmitted from each of the secondaries of intensity sufficient to fire a gas tube to which such secondaries are connected. The other contacts of the start key will connect the batteries and ground to the various points in the circuit where these sources of potential are shown. Thus the pulse created by transformer 1405 will be transmitted over conductor 1410 through the condenser 802 to fire the tube 803 and thus activate the beams of tubes 804 and 805 with such beams on their N anodes. It may be noted that each tube such as 803, connected to a correspondingly numbered anode will control the currents in the quadrature coils to point the beams to the succeeding anode. The pulse created by transformer 1406 is transmitted over conductor 1411 through condenser 1100 to fire tube 1101 to activate the beams of tubes 1102 and 1103 and point these beams to the N anodes. The pulse created by transformer 1407 is transmitted over conductor 1412, through the condenser 1600 to fire the gas tube 1601 which in turn will create a field to point the beams of tubes 1000, 1001, 1002, 1003, 1300, 1301, 1302, 1303 and 1304 to their N anodes. The pulse created by transformer 1408 will be transmitted over conductor 1413, through the condenser 1500 to fire the gas tube 1501 which in turn will create a field for the rotary beam tubes 904, 905, 906, 907, 1202, 1203, 1204 and 1205 to point their beams to their 0 anodes. The pulse created by transformer 1409 is transmitted through the rectifier 1414 (which allows pulses to be transmitted from but not to transformer 1409), conductor 1415, through condenser 1502 (the rectifier 1503 prevents transmission of this pulse to transformer 1504) to fire the gas tube 1505. The anode of tube 1505 in common with a number of other gas tubes is connected to conductor 806 leading from transformer 807 whose primary is supplied from the source 808 with alternating current of a periodicity suitable for the speed of rotation desired in the tubes of Figs. 9 and 12.

The activation of gas tube 1505 transmits alternating current superimposed on direct current through the primaries of transformers 1506, 1507, 1508 and 1305. The resulting pulses created by transformer 1508 will be transmitted over conductor 1509 to the screen of tube 1204 resulting in the clockwise rotation of the beams of the tubes of Figs. 9 and 12. The original setting of these beams by the firing of gas tube 1501 was on their zero anodes. Therefore the first of the train of pulses over conductor 1509 will be transmitted over the zero anode of tube 1204, conductor 1206, transformer 1510, to fire the next gas tube 1511. This tube in firing and beginning to operate, through the condenser 1512 quenches the tube 1501 whereby the beams of the tubes of Figs. 9 and 12 are advanced to their next or number one anodes. This is believed to be sufficient to show how the beams of these tubes may be moved step by step in a clockwise direction in response to the train of pulses transmitted to the screen of tube 1204 from the transformer 1508.

It may be noted here that when the screen of tube 1205 is similarly supplied with a train of pulses by the transformer 1513 that the beams of these tubes will be rotated in a counter-clockwise direction. The beams of the tubes initially set on their zero anodes are moved therefrom 0 to 1 by the firing of gas tube 1511 through tube 1204 or alternatively 0 to 15 by the firing of gas tube 1515 through tube 1205. Further movement in either direction will be clear from an inspection of the connection of the gas tubes 1501, 1511, 1514 and 1515, and their associated firing circuit transformers such as 1510.

As the beam of tube 907 passes its number 14 anode a pulse created in transformer 1507 is transmitted over conductor 1516, screen and anode 14 of tube 907, conductor 908, from which it is passed on through the agency of transforrmer 1306, the screen and anode N of tube 1303, conductor 1307, transformer 1416 to fire the gas tube 1417. The screens for all anodes of tube 907, excepting numbers 12, 13 and 14 are energized through transformer 1418 over conductor 1419 when the tube 1417 is fired by the pulses created in the transformer 1418 by the alternating current superimposed on direct current supplied over conductor 806 and passed by tube 1417 so that as the beam passes over anodes 15 and 0 to 9 the carry tubes 1004, 1005, 1006, and 1007 will be fired in turn then the zero tubes 1008, 1009, 1010 and 1011 of the thousands, hundreds, tens and units decimal orders of the accumulator will be fired in turn, whereby the accumulator orders are set to zero. Tubes 1308 and 1309 of the quotient digit counters are also fired but without result in this instance where an operation in multiplication is now taking place.

Though it is of no importance at this point, it may be mentioned that as the beam of tube 907 in its second rotation and after tube 1417 has been fired passes its number 9 anode a pulse will be transmitted over conductor 924, thence through transformer 1437 to fire tube 1438 to prepare the tubes 1434 and 1435 for response to pulses on the common conductor from the secondary of transformer 1439. Subsequent pulses in transformer 1437 as the beam of tube 907 passes its number 9 anode are without effect after tube 1438 has once been fired. These tubes are for use in subtraction as will be described hereinafter.

As the beam passes screen and anode 10 of tube 907 a pulse is transmitted over conductor 909, alternate contact of key 801, conductor 809, transformer 1420 to fire tube 1421, whereby transformers 1422, 1423, 1424 and 1310 are energized by the alternating current connected to conductor 806. A pulse created by transformer 1424, passes through rectifier 1426, over conductor 1427, through screen and anode N of tube 1304, transformer 1602 to fire tube 1603 and move the beams of the rotary beam tubes of Figs. 10 and 13 to their number 1 anodes. A pulse from transformer 1423 over conductor 1428 will similarly advance these beams to their number 2 anodes.

Multiplication by the tens digit of the multiplier now takes place. Anodes 1 to 9 of tubes 905 and 906 are connected to accumulator groups (T) and (H) through shift tubes 1000 and 1001 respectively. It will be noted that this circuit is arranged so that when the beam of tube 906 is passing its number 10 anode, a pulse created in transformer 1305 is passed through screen and anode 2 of tube 1303, transformer 1312, conductor 1311, screen of tube 906 before the anodes 10 to 14 thereof to the carry tubes 1004, 1005, 1006, and 1007 but in this instance will be without effect since these tubes have already been fired. As the beam of tube 906 passes anode 14, a counting pulse is created in transformer 1313 and transmitted over screen and anode 2 of tube 1300, transformer 1314, conductor 1315, screen and anode N of tube 1102, transformer 1104 to fire tube 1105 to advance the beams of tubes 1102 and 1103 to their zero anodes.

As the beams of the tubes of Figs. 9 and 12 continue to rotate over positions 1 to 9, inclusive, three pulses will be sent into the (H) accumulator group and seven into the (T) group from tube 1421. Tube 1421, now active, supplies alternating current to transformer 1422 and pulses from the secondary thereof are transmitted over rectifier 1429, conductor 1430, the upper normally closed contacts of the zero setting key 810, conductor 811 and in parallel through condensers 910 and 911 to the multiplicand digit keys. The tens digit key 902 being operated, these pulses will reach only anodes 1, 2 and 3 of tube 906 and the units key 901 being operated the pulses will reach anodes 1, 2, 3, 4, 5, 6 and 7 of tube 905. The beam of tube 905 will carry these pulses over conductor 912, transformer 1012, tube 1000 in its second position, transformer 1013, the counting conductor 1016, where they will fire the numbers 1, 2, 3, 4, 5, 6 and 7 tubes to register the digit 7 therein. Likewise these pulses will be carried by the beam of tube 906 over conductor 913, transformer 1017, tube 1001 in its second position, transformer 1018, counting conductor 1019 where they will fire the number 1 tube 1020, the number 2 tube 1021 and the number 3 tube (not shown) to register the digit 3 therein. When the beam of tube 906 sweeps over anodes 10 to 13, inclusive, the carry tubes of the accumulator groups will be fired if they are not already fired. At anode 14 a counting pulse is transmitted through tube 1102 to move the beams of tubes 1102 and 1103 to position 1. This pulse is transmitted from tube 1505, transformer 1305, tube 1303 in its second position, transformer 1312, conductor 1311, screen and anode 14 of tube 906, conductor 914, transformer 1313, tube 1300 in its second position, transformer 1314, conductor 1315, tube 1102 in its 0 position, transformer 1106, to fire the 0 tube 1107 to advance the beams of tubes 1102 and 1103 to their next or number 1 positions.

The beams of tubes 905 and 906, on the next rotation will read a second 3 and 7 into the (H) and (T) accumulator groups respectively. The pulses advance the firing of the tubes in the two groups so that in the (H) group, the tube 6 is fired (3+3=6) and in the (T) group tube 4 is fired (7+7=14). As tube 1010 fires in the (T) group upon registering the third pulse of this second operation, tube 1022 also fires, and tube 1005 is extinguished. When the beam of tube 906 passes the 11th position, tube 1005 will again be fired and tube 1022 extinguished. This action, however, creates a pulse over the counting conductor 1019 for the (H) group and fires tube 7 of that group. Thus 0740 is registered in the accumulator.

When the beam of tube 906 passes anode 14, tube 1605 is fired to move the beams of the shift tubes (of Figs. 10 and 13) to their position 3. A pulse may be traced from tube 906 over conductor 914 as before to tube 1102 to advance tubes 1102 and 1103 to their positions 2. A pulse is now created by tube 1421, transformer 1310, tube 1301 in its second position, transformer 1316, conductor 1317, upper contacts of the number 2 digit key 1201 of the tens multiplier keys, conductor 1207, number 2 screen and anode of tube 1103, transformer 1108, rectifier 1109, conductor 1110, tube 1304 in its second position transformer 1606 to fire tube 1605 and thus move the beams of the shift tubes to their number 3 positions. Thus the number of additions of the multiplicant effected by tubes 905 and 906 is controlled by the tens multiplier digit key 1201.

It may be noted here as a matter of interest that the beams of the tubes of Figs. 9 and 12 will make two more revolutions than are indicated by the tens multiplier digit written up on the keys in Fig. 12, the first revolution resulting mainly in the firing of tube 1417 to supply pulses to tube 907 for use during the second revolution to set the accumulators to zero and prepare the carry tubes. Thus with a tens multiplier digit of 2 the multiplicand is entered into the accumulators two times during the third and fourth revolutions of the beams. At the end of the fourth revolution (at anode 14 of 906) the beam of tube 1102 is moved from its number 1 to its number 2 position whereupon the shift is made and the tubes of Figs. 10 and 14 are moved to their number three positions. With a units multiplier digit 2, the shifted multiplicand will now be entered in the accumulators during the fifth and sixth revolution of the beams. It should be noted that since there is now no extra counting pulse to be absorbed, the arrangement of the tubes 804 and 805 is slightly different than tubes 1102 and 1103. In this case (and in all others where a larger number of multiplier digits are provided for) the normal (N) position of the tube is between 0 and 1 rather than between 9 and 0 where this extra pulse had to be absorbed. Therefore two counts truly represents the multiplier digit 2.

The multiplicand recorded on the keys in the banks connected to the tubes 905 and 906 is now added in the accumulator the number of times as determined by the units multiplier digit key 903. With the beams of the shift tubes of Figs. 10 and 13 at their number 3 positions the units multiplicand digits are added in the (U) accumulator group and the tens in the (T) group. In the present example, two additions will occur as determined by the number 2 digit key 903. It will be noted that the counting pulses from tube 906, anode 14 are effective to step the beams of tubes 804 and 205 when the shift tubes are in their number 3 positions. When two additions have been placed in the accumulators, the beams of the shift tubes are stepped to position 4.

At the beginning of these two additions, the accumulators registered 0740. The first addition of 0037 changed the registration to 0777 and the second completed the problem, placing 0814 in the accumulators. It should be noted that the pulses controlled by the multiplicand keys through tubes 905 and 906 registered 0704 in the accumulators and that tubes 1023 and 1022 are fired indicating carries from the (U) and (T) groups. As the beam of tube 906 passes anode 10, tube 1004 is fired, a pulse is transmitted over counting conductor 1016 and 1 is registered in the (T) group. As the beam of tube 906 passes anode 11, tube 1005 is fired to add 1 to the (H) group, registering 8 therein. The carry pulses thus complete the final registration of the result and occur successively in the accumulator groups with the (U) or extreme right-hand decimal denominational order. This successive operation is required to provide for carrying through 9's.

When the beams of the shift tubes are stepped to their position 4, the multiplication is complete. As hereinbefore stated the means of indicating the result is not shown in detail but only indicated by the coils in the anode circuits of the accumulator tubes. As a further indication a relay 1607 is shown which is energized after tube 1608 is fired from tube 1303 in its position 4. The contacts of relay 1607 may be employed to light lamps selectively connected by the relays whose windings are indicated in the anode circuits of the accumulator tubes.

The system is restored to normal by restoring the start key 1400 to normal.

*Division*

The dividend is registered on the keys connected to tubes 904 and 1202 and the divisor is registered on the keys connected to the tubes 905 and 906. Key 812 is operated to adjust the system for an operation in division. The operation of the start key 1400 energizes the system as before and tube 1505 is energized to cause the beam of tube 907 to rotate in a clockwise direction. Tube 1417 is fired near the end of the first revolution of the beams of the tubes of Figs. 9 and 12 when the beam of tube 907 passes its fourteenth anode and the four decimal denominational orders of the accumulator are set to zero as hereinbefore described.

By way of example let it be assumed that 37 will be divided by 22. Keys 915, 1208, 916 and 917 will be depressed. As the beam of tube 907 passes its anode 11, a pulse is transmitted over conductor 918, the upper alternate contacts of division key 812, conductor 813, transformer 1431 to fire tube 1432. The firing of tube 1432 extinguishes tube 1417 so that during the following movements of the beam of tube 907 the zero setting anodes will not be affected. Alternating current on conductor 806 is now transmitted over conductor 1433 to transformers 1318 and 1319. A pulse from transformer 1319 is transmitted through tube 1304 in its N position to fire tube 1603 to advance the beams of the shift tubes of Figs. 10 and 13. Thereupon pulses created in transformer 1318, are transmitted through tube 1301, position 1, transformer 1320, conductor 1321, the lower, normally closed contacts of subtraction key 814 to conductor 815 to affect screens 1 to 7, inclusive, of tube 904 and screens 1 to 3, inclusive, of tube 1202. Following this the beam of tube 907 passes its fourteenth anode, whereupon a pulse is transmitted over conductor 908, transformer 1306, tube 1303 in its number 1 position, conductor 1322, the lower alternate contacts of division key 812, conductor 816 and transformer 1111 to fire tube 1123 which primes tubes 1112 and 1113 to respond to the next pulse delivered by transformer 1111 when the beam of tube 907 contacts its fourteenth anode after the dividend has been entered. Therefore 7 pulses will be transmitted over conductor 919, transformer 1024, tube 1000 in its number 1 position, transformer 1013 to count seven on the (T) chain, and three pulses will likewise be transmitted over conductor 1209, transformer 1025, tube 1001 in its number 1 position, transformer 1018 to count three on the (H) chain thus registering the dividend in the accumulator. When the beam of tube 907 passes its anode 14, a pulse is transmitted over conductor 908, transformer 1306, tube 1303 in its number 1 position, conductor 1322, the lower alternate contacts of division key 812, conductor 816, and transformer 1111 to fire both of tubes 1112 and 1113. As tube 1112 fires, tube 1432 will be extinguished. A pulse created in transformer 1115 is transmitted over rectifier 1116, conductor 1428, tube 1304 in its position number 1 to fire tube 1604 to advance the beams of the shift tubes of Figs. 10 and 13 to their number 2 positions. When tube 1112 fires, a pulse is also transmitted over conductor 1117 to fire tube 1517 and to extinguish tube 1505. This last change renders tube 1204 ineffective and tube 1205 effective so that now the beams of the tubes of Figs. 9 and 12 will reverse and rotate in a counter-clockwise direction. This action is caused as the beam of tube 907 reaches its number 14 anode so that it will not reach anode 15 but instead will immediately swing back and move past anodes 13, 12, 11 and so on.

The beams of the shift tubes are now pointed to their number 2 anodes and the beams of the tubes of Figs. 9 and 12 are rotating in a counter-clockwise direction. As the beam of tube 905 sweeps over its screen and anode 11, a pulse created in transformer 1518 is transmitted over conductor 1519, screen and anode 11 of tube 905, conductor 920, a normally closed upper contact of subtraction key 814, conductor 817, transformer 1323, tube 1302 in its number 2 position, transformer 1324 to the counting conductor 1325. The zero tube 1308 having been fired on a previous clockwise rotation of the beam of tube 907, tube 1326 will now fire and extinguish tube 1308.

As the beams of tubes 905 and 906 sweep over anodes 9 to 1, in that order, pulses are sent into the (H) and (T) accumulator groups, in which 3 and 7 have been registered as previously described. It will be noted that the circuit from transformer 1114 extends over conductor 1118, connects through normally closed contacts of the digit keys beginning with 9. Therefore with keys 916 and 917 operated, the circuits are now arranged to produce registering pulses as the beams pass over anodes 9, 8, 7, 6, 5, 4 and 3 in each case, that is seven counts will be made in each of the (T) and (H) accumulator groups, 77 being the nine's complement of 22. Nine pulses will be generated by tube 1203 and transmitted over conductor 1210, through transformer 1026, tube 1002 in its second position, transformer 1027, counting conductor 1029 to register 9 in this (TH) accumulator group. As the beam of tube 905 passes anode 0 an additional pulse, derived from transformer 1518 is sent into the (T) accumulator group. This provides the added 1 (known as the fugitive 1) to change the nine's complement to the true (ten's) complement of the number to be subtracted, in this case 22. Hence 78, the ten's complement of 22 has been added to the value already registered in the accumulator. Also a 9 has been added to the (TH) group. However, due to the carry the accumulator will register 0150 when the beam of tube 905 passes anode 10. As the beam passes screen and anode 11 of tube 905, one count is registered in the (T) quotient digit counting group through a circuit extending over conductor 920, normally closed contacts of subtraction key 814, conductor 817, transformer 1323, tube 1302 in its second position, transformer 1324, counting conductor 1325 to fire tube 1327 representing the digit 0.

As the beams continue their counter-clockwise rotation in the tubes of Figs. 9 and 12 the second addition of 9780 will be made in the accumulator resulting in an accumulation of the value 9930 and the firing of tube 1328 representing the digit 1. With such a value registered, tube 1505 will be fired and tube 1517 is extinguished. This is brought about as follows. With the digit 9 registered in the (TH) accumulator group the tube 1030 will have been fired and will be in a conducting state. Therefore, as the beam in tube 905 encounters anode 10 a pulse is transmitted over conductor 921, a normally closed contact of the subtraction key 814, conductor 818, transformer 1031, whereby a pulse will be transmitted over conductor 1032, through transformer 1504 to fire tube 1505 and extinguish tube 1517. This shows that one two many subtractions by complementary additions have been made and it is time to shift. However, before shifting the divisor must be added once to correct for over-subtraction. The firing of tube 1505 reverses the direction of the beams of the tubes of Figs. 9 and 12. Now pulses derived from transformer 1506 will be transmitted over tube 1113, transformer 1119, rectifier 1120, conductor 1121, conductor 811 to supply pulses to the tubes 905 and 906 for clockwise rotational use whereby 0220 is added to the value 9930 now registered in the accumulator. As the final carry pulse is transmitted tube 1007 is fired and as tube 1033 is thereby extinguished a pulse is created and transmitted over rectifier 1034 and conductor 1035 to fire the tube 1517 and extinguish tube 1505. Upon this latter occurrence a pulse is transmitted over rectifier 1520, conductor 1110, tube 1304 in its second position to fire tube 1605 to advance the beams of the tubes of Figs. 10 and 13 to their third positions.

When tube 1517 fires the direction of rotation of the beams of the tubes of Figs. 9 and 12 is again reversed to a counter-clockwise movement. As the beam of tube 905 passes anode 11 one count is added to the (U) quotient digit group resulting in the firing of tube 1329. Since the beams of the shift tubes are now pointing to their number 3 anodes the pulses from tube 1203 now enter both the (TH) and the (H) accumulator groups by way of transformers 1028 and 1026 and tubes 1003 and 1002 respectively. Pulses from tube 905 enter the (U) group and pulses from tube 906 enter the (T) group so that the value 9978 will be repeatedly added to the value accumulated. This continues until by seven additions of 9978 produce the value 9996 whereupon the tube 1030 being active passes a pulse as before to fire the tube 1505 and extinguish the tube 1517. At this time the tube representing the digit 6 in the (U) group of quotient digit counters is active. As the direction of rotation of the beams of the tubes of Figs. 9 and 12 is reversed, the divisor 0022 is then added once producing the remainder 0018. Thus 37 divided by 22 is calculated to be 1.6 with a remainder of 1.8 (the decimal point being inserted since the dividend 37 was actually entered as 0370). As the final carry pulse is transmitted tube 1007 is fired and as tube 1033 is thereby extinguished a pulse is created and transmitted over rectifier 1034 and conductor 1035 to fire the tube 1517 and extinguish tube 1505.

As tube 1505 is extinguished, as before, a pulse is transmitted over rectifier 1520 and conductor 1110 fires tube 1609 and moves the beams of the shift tubes to their positions 4.

In this position the tube 1608 is fired and relay 1607 is operated to display the registration of the quotient digits and the remainder.

The operations on division may be tabulated thus:

| In the (T) quotient digit counting group | The Accumulator registers | | | |
|---|---|---|---|---|
| | (TH) | (H) | (T) | (U) |
| 1308 fired and accumulator set to zero | 0 | 0 | 0 | 0 |
| The dividend is registered | 0 | 3 | 7 | 0 |
| Complement of divisor added once | 9 | 7 | 8 | 0 |
| | 0 | 1 | 5 | 0 |
| Complement of divisor added again | 9 | 7 | 8 | 0 |
| | 9 | 9 | 3 | 0 |
| Beams reversed and divisor added once | 0 | 2 | 2 | 0 |
| | 0 | 1 | 5 | 0 |
| Shift tubes move to position 3<br>Complement of divisor added once | 9 | 9 | 7 | 8 |
| | 0 | 1 | 2 | 8 |
| Complement of divisor added twice | 9 | 9 | 7 | 8 |
| | 0 | 1 | 0 | 6 |
| Complement of divisor added a third time | 9 | 9 | 7 | 8 |
| | 0 | 0 | 8 | 4 |
| Complement of divisor added a fourth time | 9 | 9 | 7 | 8 |
| | 0 | 0 | 6 | 2 |
| Complement of divisor added a fifth time | 9 | 9 | 7 | 8 |
| | 0 | 0 | 4 | 0 |
| Complement of divisor added a sixth time | 9 | 9 | 7 | 8 |
| | 0 | 0 | 1 | 8 |
| Complement of divisor added a seventh time | 9 | 9 | 7 | 8 |
| | 9 | 9 | 9 | 6 |
| Beams reversed and divisor added once | 0 | 0 | 2 | 2 |
| | 0 | 0 | 1 | 8 |

The quotient digits displayed will be 1 and 6 and the remainder, as above, will be 0018, which is correct when due allowance is made for the decimal point.

*Accumulation and zero setting*

When it is desired to accumulate results of several multiplications the keys 922 (Fig. 9) and 1036 (Fig. 10) (which keys are physically operated by a single lever but shown separated here for the sake of clarity) are operated just before the start key 1400 is restored after the first multiplication has been completed. The battery shown on the normal contact of key 1036 is that which is supplied by the start key 1400 but that on the operated contact is a permanently connected battery so that with key 1036 operated the values accumulated will not be lost when the start key is restored to prepare for the next operation. Key 922 disconnects the screens of anodes 15 and 0 to 8 from the transformers 1418 so that the accumulation will not be disturbed by any attempt at zero setting at the start of each multiplication.

For addition and subtraction keys 922 and 1036 are operated, and, unless a number is registered in the accumulator and these keys have been operated before the start key was released, it is necessary to set the accumulators to zero. A zero setting key 810 is provided which causes zeros to be set in the accumulators as previously described under "Multiplication," that is, with the zero setting key 810 operated the effect of the start key will be similar to that which occurs when the multiplication key 801 is operated. However, no multiplication takes place because the pulsing conductor 811 which is normally supplied from transformer 1422 over conductor 1430 is opened at the upper contacts of key 810. Transformer 819 is connected to the screen of tube 805 before the anode N thereof, whereby a pulse is created in transformer 1108 and transmitted over conductor 1110 to drive the shift tubes to their number 4 position. Keys 922 and 1036 are then operated before the start key 1400 is released to hold the zero setting in the accumulator.

*Addition*

For addition the number to be added is written on the same keys used for the multiplicand and the addition key 820 is operated. Key 1036 must be operated to hold the sum in the accumulator by connecting battery directly to the accumulator tubes. The operation of the system on addition is the same as for multiplication up to the completion of the first addition. At this time the beam of tube 805 is pointing to anode 1 and pulses from transformer 819 through contacts of key 820 tube 805 and transformer 1108 fires tube 1609 through anode 3 of tube 1304 to step the beams of the shift tubes to anodes 4 to display the sum in the manner previously described.

*Subtraction*

Unless a previously accumulated value is held in the accumulator, the number from which the subtraction is to be made, is first registered in the accumulator as an addition to zero as previously described. Keys 922 and 1036 must be operated to hold the accumulator. The subtrahend is then written on the keys before tubes 905 and 906 and the subtraction key 814 is operated. The operation for subtraction is the same as for division up to the completion of the first subtraction, by complementary addition, because the effect of the keys before the tubes 904 and 1202 is avoided by the break between conductors 815 and 1321 at the lower normally closed contact of key 814. The counting pulse generated by the sweep of the beam of tube 905 over screen and anode 11 thereof is however effective through transformer 1439 to fire tube 1434 to absorb the pulse occurring prior to the first subtraction as previously described. After the subtraction has been made the counting pulse fires tube 1435 which passes a pulse over conductor 1436, transformer 1331, tube 1304 in its positions 2 and 3 to step the beams of the shift tubes to position 4 and display the remainder in the manner previously described.

What is claimed is:

1. In a calculator, electronic means for performing mathematical calculations including closed rings of gas tubes each of said rings being responsive to impulses applied to a single incoming path and each of said rings having a zero setting path for energizing said ring at a given point, said rings being arranged as successive decimal denominational orders and having carry means between each said order and the next succeeding higher order, a rotating beam tube for each decimal denominational order, of numbers to be entered into said closed rings, each said tube having a plurality of anode circuits and being arranged to transmit trains of impulses over an outgoing path, means for simultaneously connecting each of said outgoing paths to an incoming ring path and for successively shifting said connections to different denominational orders, an auxiliary rotating beam tube and auxiliary circuits controlled by said auxiliary rotating beam tube for controlling said carry means and said zero setting circuits.

2. In a calculator, electronic means for performing mathematical calculations including closed rings of gas tubes, each of said rings being responsive to impulses applied to a single incoming path and each of said rings having a zero setting path for energizing said ring at a given point, said rings being arranged as successive decimal denominational orders and having carry means between each said order and the next succeeding higher order, a rotating beam tube for each decimal denominational order of numbers to be entered into said closed rings, each said tube having an outgoing path and being arranged to transmit a train of implses over said outgoing path, means for successively connecting said outgoing paths to different ones of said incoming paths, and means including a common beam directing field for controlling the beams of said rotating beam tubes to rotate in synchronism.

3. In combination, a rotary beam tube having a plurality of incoming paths, a single outgoing path and means for periodically and successively interconnecting said incoming and said outgoing paths, a second rotary beam tube having a single incoming path connected to said outgoing path of said first tube, a plurality of outgoing paths and step by step means for successively interconnecting said incoming and said outgoing paths of said second tube, each said step embracing a complete rotation of the beam of said first tube and a plurality of closed ring electronic tube counters each connected to one of said outgoing paths of said second rotary beam tube.

4. In combination, a rotary beam tube having a plurality of incoming paths, a single outgoing path and means for periodically and successively interconnecting said incoming and said outgoing paths, a second rotary beam tube having a single incoming path connected to said outgoing path of said first tube, a plurality of outgoing paths and step by step means for successively interconnecting said incoming and said outgoing paths of said second tube, each said step embracing a complete rotation of the beam of said first tube, a plurality of closed ring electronic tube counters each connected to one of said outgoing paths of said secondary rotary beam tube, and carry circuits interconnecting each said counter and the next higher denominational order.

5. In combination, a rotary beam tube having a plurality of incoming paths, a single outgoing path and means for periodically and successively interconnecting said incoming and said outgoing paths, a second rotary beam tube having a single incoming path connected to said outgoing path of said first tube, a plurality of outgoing paths and step by step means for successively interconnecting said incoming and said outgoing paths of said second tube, each said step embracing a complete rotation of the beam of said first tube, a plurality of closed ring electronic tube counters each connected to one of said outgoing paths of said second rotary beam tube, carry circuits interconnecting each said counter and the next higher denominational counter and a third rotary beam tube operating synchronously with said first rotary beam tube and having control circuits extending therefrom to each of said counters for setting said counters to zero positions and other control circuits extending therefrom for operating said carry circuits.

6. In combination, a rotary beam tube having a plurality of incoming paths, a single outgoing path and means for periodically and successively interconnecting said incoming and said outgoing paths, a second rotary beam tube having a single incoming path connected to said outgoing path of said first tube, a plurality of outgoing paths and step by step means for successively interconnecting said incoming and said outgoing paths of said second tube, each said step embracing a complete rotation of the beam of said first tube, a plurality of closed ring electronic tube counters each connected to one of said outgoing paths of said second rotary beam tube, carry circuits interconnecting each said counter and the next higher denominational counter and a third rotary beam tube operating synchronously with said first rotary beam tube and having control circuits extending therefrom to each of said counters for setting said counters to zero positions, other control circuits extending therefrom for operating said carry circuits, and a common field for said first and said third rotary beam tubes.

7. In combination, a rotary beam tube having a plurality of incoming paths, a single outgoing path and means for periodically and successively interconnecting said incoming and said outgoing paths, a second rotary beam tube having a single incoming path connected to said outgoing path of said first tube, a plurality of outgoing paths and step by step means for successively interconnecting said incoming and said outgoing paths of said second tube, each said step embracing a complete rotation of the beam of said first tube, a plurality of closed ring electronic tube counters each connected to one of said outgoing paths of said second rotary beam tube, and means to selectively render different numbers of said first tube incoming paths effective, whereby different numbers may be transmitted by said first tube and distributed by said second tube to said counters.

8. In combination, a plurality of rotary beam tubes each having a plurality of incoming paths, a single outgoing path and means for periodically, successively and electronically interconnecting said incoming and said outgoing paths, a second plurality of rotary beam tubes each having a single incoming path connected to one of said outgoing paths of said first plurality of rotary beam tubes, a plurality of outgoing paths and step by step means for successively and electronically interconnecting said incoming and said outgoing paths of said tubes of said second plurality, each said step embracing a complete rotation of the beam of its said associated tube of said first plurality of tubes and a plurality of closed ring electronic tube counters each connected to a plurality of second tube outgoing paths of different tubes of said second plurality.

9. In combination, a plurality of rotary beam tubes each having a plurality of incoming paths, a single outgoing path and means for periodically, successively and electronically interconnecting said incoming and said outgoing paths, a second plurality of rotary beam tubes each having a single incoming path connected to one of said outgoing paths of said first plurality of rotary beam tubes, a plurality of outgoing paths and step by step means for successively and electronically interconnecting said incoming and said outgoing paths of said tubes of said second plurality, each said step embracing a complete rotation of the beam of its said associated tube of said first plurality of tubes, a plurality of closed ring electronic tube counters each connected to a plurality of second tube outgoing paths of different tubes of said second plurality, a common field for said first plurality of tubes and a common field for said second plurality of tubes.

10. In combination, a plurality of rotary beam tubes each having a plurality of incoming paths, a single outgoing path and means for periodically, successively and electronically interconnecting said incoming and said outgoing paths, a second plurality of rotary beam tubes each having a single path connected to one of said outgoing paths of said first plurality of rotary beam tubes, a plurality of outgoing paths and step by step means for successively and electronically interconnecting said incoming and said outgoing paths of said tubes of said second plurality, each said step embracing a complete rotation of the beam of its said associated tube of said first plurality of tubes and a plurality of closed ring electronic tube counters each connected to a plurality of second tube outgoing paths of different tubes of said second plurality in a progressively advanced pattern, whereby the denominational order of said electronic tube counters is successively shifted on each step of said second plurality of rotary beam tubes.

SAMUEL B. WILLIAMS.

REFERENCES CITED

The following references are of record in the file of this patent:

UNITED STATES PATENTS

| Number | Name | Date |
|---|---|---|
| 2,095,929 | Finch | Oct. 12, 1937 |
| 2,185,693 | Mertz | Jan. 2, 1940 |
| 2,195,098 | Skellett | Mar. 26, 1940 |
| 2,224,677 | Hanscom | Dec. 10, 1940 |
| 2,250,528 | Gray | July 29, 1941 |
| 2,361,766 | Hadekel | Oct. 31, 1944 |
| 2,373,134 | Massonneau | Apr. 10, 1945 |
| 2,405,096 | Mumma | July 30, 1946 |
| 2,412,467 | Morton | Dec. 10, 1946 |